United States Patent
Ellis

(10) Patent No.: US 6,661,890 B1
(45) Date of Patent: Dec. 9, 2003

(54) APPARATUS FOR PRESTORED BYPASS DIALING

(76) Inventor: Charles N. Ellis, 3929 Waldenwood, Ann Arbor, MI (US) 48105-3009

( * ) Notice: Subject to any disclaimer, the term of this patent is extended or adjusted under 35 U.S.C. 154(b) by 0 days.

(21) Appl. No.: 09/528,141

(22) Filed: Mar. 17, 2000

Related U.S. Application Data

(60) Provisional application No. 60/124,827, filed on Mar. 17, 1999.

(51) Int. Cl.[7] .................................................. H04M 1/00
(52) U.S. Cl. .............................. 379/355.01; 379/356.01
(58) Field of Search ....................... 379/201.01, 207.11, 379/355.01, 356.01, 173

(56) References Cited

U.S. PATENT DOCUMENTS

| | | |
|---|---|---|
| 4,232,200 A | 11/1980 | Hestad et al. |
| 4,243,845 A | 1/1981 | Feinberg et al. |
| 4,277,651 A | 7/1981 | Fisher, II et al. |
| 4,720,855 A | 1/1988 | Ohnishi et al. |
| 4,764,951 A | 8/1988 | Kotani et al. |
| 4,791,667 A | 12/1988 | Havel |
| 4,953,202 A | 8/1990 | Newell |
| 4,975,943 A | 12/1990 | Weber et al. |
| 5,268,959 A | 12/1993 | Hong |
| 5,491,745 A | 2/1996 | Roeder |
| 5,550,915 A | 8/1996 | Partridge, III |
| 5,710,808 A | 1/1998 | Eaton |
| 5,719,931 A | 2/1998 | Johnson |

*Primary Examiner*—Creighton Smith
(74) *Attorney, Agent, or Firm*—Young & Basile, PC

(57) ABSTRACT

A telecommunication method and apparatus includes at least one bypass carrier code for completing a telecommunication connection between a telecommunication device and a communication network. The bypass carrier code is automatically entered for each outgoing toll and long distance call requiring a long distance carrier whenever a telephone number is input through a keypad or selected from a plurality of prestored memory telephone number locations. In one aspect, the bypass carrier code is stored in the memory of the telecommunication device. In alternate aspects, the bypass carrier code is re-programmable through the keypad or other numeric input on the telecommunication device or selectable by an input selector from a plurality of discrete bypass carrier codes.

18 Claims, 5 Drawing Sheets

APPARATUS FOR PRESTORED BYPASS DIALING

CROSS REFERENCE TO CO-PENDING APPLICATION

This application claims the benefit of the filing date of co-pending, provisional patent application serial No. 60/124,827, filed Mar. 17, 1999, the entire contents of which are incorporated herein by reference.

BACKGROUND OF THE INVENTION

The present invention relates, in general, to telecommunications and, more specifically, to bypass code dialing.

In the United States, telephone service is provided from a telephone by a local service provider or local exchange carrier. The local service provider serves the calling and call telephones that are typically interconnected by long distance or interexchange carriers, such as AT&T and MCI, for example.

A consumer can choose among the interexchange carriers for long distance or toll calls by subscribing to a particular carrier whereby each long distance call is indicated by an access code (usually 1) and routed through the selected carrier or by dialing a particular carrier's access code on any telephone call.

In memory-type telephones, multiple telephone numbers are prestored in a memory by the end user ("user defined memory") and automatically dialed by merely depressing a specific memory push button or by selecting a specific number from a display menu. A typical memory telephone has the capability of storing a number of digits at each memory location associated with a specific push button, such as a 7-digit local exchange or an 11-digit long distance or toll exchange including a beginning "1" and an area code.

U.S. Pat. Nos. 5,550,915 and 5,719,931 show various means for automatically dialing a selected interexchange carrier access code on each outgoing telephone call from a particular phone. While these circuits are useful in selecting the desired interexchange carrier, the recent availability of multiple bypass carriers has introduced additional variables confronting a consumer in placing a long distance telephone call by the desired carrier and at the lowest rate.

The bypass carriers have their own specific bypass code, such as "10XX-XXX". The last set of digits are a distinct 3 to 5-digit code, assigned to each bypass carrier. The entire code, including the typical prefix digits "10-10" must be dialed by a consumer on each outgoing telephone call. Since consumers have a tendency to forget to dial a bypass code or may be in a hurry and simply dial a "1", an area code and a telephone number, the long distance telephone charges for a particular call may not be as low as if the bypass carrier were used on all outgoing long distance or toll calls. Since the push button memories are capable of storing the long distance telephone call initiator "1" followed by the area code and a 7-digit telephone number, depressing a memory push button will not necessarily enable a particular bypass carrier code to be selected. The telephone user has to manually input the desired bypass code for each telephone memory stored call number to maximize the cost savings available through use of a bypass carrier. In some telephones, push button memories do not have the capacity to store the bypass code and the telephone number (total of 18 digits) in a single memory. Certain bypass codes allow the user to reach other services such as directory assistance.

Thus, it would be desired to provide an apparatus which automatically includes a bypass carrier code with each outgoing, original, memory toll or long distance call. It would also be desirable to provide an apparatus which alternately automatically includes a bypass carrier code on each outgoing keypad originated toll or long distance telephone call. It would also be desirable to provide an apparatus which enables a user to select one of multiple bypass carrier codes for any telephone call, with the selected bypass code automatically included in any call. It would also be desirable to provide an apparatus which enables a prestored bypass number or numbers in a particular telephone to be easily reprogrammed. It would also be desirable to provide an apparatus which automatically provides a bypass carrier code on each outgoing memory originated telephone call. It would also be desirable to provide an apparatus that has a push button, display screen, menu, or other signaling device which, when activated, provides a bypass code that accesses a bypass long-distance carrier or other service, such as directory information. It would also be desirable to provide an apparatus that prohibits the use of a bypass or access code from the keypad, or, in some embodiments, which still enables normal operation of the keypad in dialing long distance telephone calls with or without an access or bypass carrier code.

Finally, it would be desirable to provide an apparatus that provides a push button for easy access to a bypass carrier yet still enables normal operation of the keypad in dialing local and long distance telephone calls with or without a bypass carrier code and that prevents the end user from accessing any long distance or bypass carrier from user defined push button memory. Further, in some embodiments, it would be desirable to permanently store numbers, such as bypass access codes, in certain memories that cannot be changed by the end user.

SUMMARY OF THE INVENTION

The present invention is a method and apparatus for automatically inserting a bypass carrier code in proper telecommunication numeric sequence on each outgoing toll and long distance telephone call from a telecommunications device to a communication network.

In one aspect, the present invention is a method for automatic bypass code dialing comprising the steps of:

providing a bypass carrier code to connect a telecommunication device with a communication network; and automatically including the bypass carrier code on each outgoing toll and long distance telephone call from the telecommunication device.

In this aspect of the invention, the method further includes the steps of:

storing a telephone number in memory in the telecommunication device;

selecting the memory telephone number; and automatically including the bypass carrier code with the memory telephone number in proper telecommunication numeric sequence in each outgoing telephone call to the communication network when the memory telephone number is selected.

In another aspect of the invention, the method comprises the steps of:

storing a plurality of bypass carrier codes in the telecommunication device; and selecting one of the plurality of bypass carrier codes on each outgoing telephone call from the telecommunication device requiring a long distance carrier.

In yet another aspect of the invention, the method comprises the step of:

providing the telecommunication device with numeric input; and reprogramming the bypass carrier code stored in the telecommunication device through the numeric input.

In another aspect of the invention, the method comprises of steps:

providing a selector on the telecommunication device for selecting a distinct one of the plurality of bypass carrier codes stored in the telecommunication device.

In another aspect of the invention, the method comprises the steps of:

a. providing a plurality of memory locations in the telecommunication device for storing individual telephone numbers;

b. entering a telephone number having a series of digits;

c. checking the first telephone number digit and, if the first telephone number digit is not a long distance call indicator, registering all of the telephone number digits in input sequence;

d. if the telephone number digits total more than seven, adding a bypass carrier code indicator to the entered telephone number and storing the telephone number and bypass carrier code indicator in a memory location;

e. if the telephone number digits are less than or equal to seven, storing the telephone number digits in the input sequence in a selected memory location in the telecommunication device; and f. if the first input telephone numeric digit is a long distance call indicator, not registering the first telephone number digit and repeating steps c–e.

In another aspect of the invention, the method comprises the steps of:

a. providing a plurality of memory locations in the telecommunication device for storing individual telephone numbers;

b. entering a telephone number having a series of digits;

c. checking the first telephone number digit and, if the first telephone number digit is not a long distance call indicator, registering all of the telephone number digits in input sequence; and d. if the first input telephone numeric digit is a long distance call indicator, not registering the first telephone number digit and repeating step c for each succeeding telephone number digit.

In another aspect, the method comprises of the steps of:

determining if a first input telephone number digit is from a numeric input or a memory telephone number selector on the telecommunication device;

if the input telephone number digit is input by the keypad, determining if the first digit is a long distance call indicator;

if the first digit is not a long distance call indicator, checking the second digit for a prestored telephone number selector;

if the second digit is a prestored telephone number, outputting the entire telephone number digit sequence to a tone generator in the telecommunication device;

if the second digit is not a prestored telephone number, outputting the bypass carrier code and the last ten entered input numeric digits to the tone generator;

if the first entered digit is not a long distance call indicator, outputting all of the entered numeric digits to the tone generator;

if the telephone number digit is from the prestored memory telephone number, determining if a bypass carrier code indicator is associated with the stored memory telephone number;

if the bypass carrier code indicator is not associated with the stored memory telephone number, outputting the memory pushbutton telephone number to the tone generator; and if the bypass carrier code indicator is associated with the stored memory telephone number, supplying the bypass carrier code to the tone generator and then supplying the memory stored telephone number to the tone generator.

In another aspect, the method comprises of the steps of:

determining if a telephone numeric digit input is from the keypad on the telecommunication device;

checking the total number of telephone number digits input through the keypad;

if the total number of input telephone number digits are less than or equal to seven, outputting the input telephone number digits to the tone generator;

if the total number of input telephone number digits is greater than or equal to ten digits, checking a prestored telephone number for a match;

if a match exists, outputting the input telephone number digits to the tone generator; and if there is no match, outputting the prestored bypass carrier code and the last ten digits in proper telecommunication numeric sequence to the tone generator.

In another aspect of the present method, the method includes the steps of:

storing one or more bypass codes in the telecommunication device; and allowing a user to select one of the bypass codes before dialing an outgoing telephone call number either manually through a keypad or through the use of a memory telephone number selection device.

The present method also includes the step of preventing the storage in a memory location of a telephone number that begins with a long distance telephone call indicator.

The present method also prevents the tone generator in the telecommunication device from outputting a long distance call indicator.

Finally, the method of the present invention includes the step of adding the bypass code to all outgoing telephone calls made with a leading long distance telephone call indicator.

The present invention also contemplates a telecommunication device for making outgoing telephone calls through a connection to a communication network including at least one bypass carrier selectable by a bypass carrier code, telecommunication device includes, in one aspect, a numeric input on the telecommunication device for inputting a telephone number formed of a plurality of sequential numeric digits, a memory for storing a bypass carrier code, and a control automatically inserting the bypass carrier code on each outgoing toll and long distance telephone call from the telecommunication device in proper telecommunication numeric sequence.

The telecommunication device further includes, the memory including a storage of a plurality of input memory telephone numbers, inputs on the telecommunication device for selecting one of the memory telephone numbers, and the control automatically inserting the selected bypass carrier code in proper telecommunication numeric sequence with the selected memory telephone number on each outgoing telephone call.

The present method and apparatus insure that a bypass carrier code is automatically included in proper numeric sequence with each outgoing original, memory toll or long distance call from a telecommunication device. The invention provides the bypass carrier code in memory or selectable through input selectors or even re-programmable through the telecommunication device.

The present invention is also capable of automatically sensing the long distance telephone call indicator or the initial bypass carrier code indicator for each input telephone call and then either automatically inserts a selected prestored bypass carrier code before the area code and telephone number input by the user, or before a prestored memory telephone number.

The invention can also insert a user selected bypass carrier code from prestored codes.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
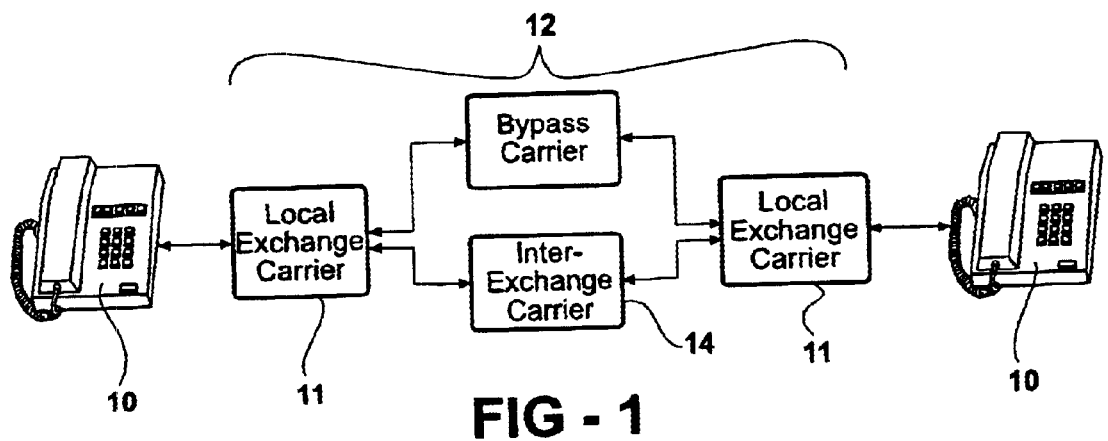
FIG. 1 is a block diagram illustrating a typical telecommunication system.

Referring now to FIG. 1, there is depicted a pictorial representation of a typical network connection between single user telephones 10 and a telephone communication network 12. The network 12 may comprise a conventional wire telephone network as well as wireless, cellular and other forms of telecommunication networks. User telephones 10 may also refer to telefax machines, modems, and other end user equipment.

An interexchange carrier 14 is part of a telecommunication network 12 for typically handling long distance or toll telephone calls between user telephones 10. The interexchange carrier may be one of a number of conventionally available carriers, such as AT&T, MCI, etc. A plurality of bypass carriers 16 are also interposeable between the user telephones 10 for handling long distance or toll telephone calls in lieu of the interexchange carrier 14.

As is conventional, the interexchange carrier 14 is selected for a user telephone on a continuous basis by a user such that the telephone switching system automatically utilizes the specific selected interexchange carrier for each long distance or toll call. Alternately, the user can dial a specific bypass carrier code thereby routing a long distance or toll telephone call through the selected bypass carrier 16 within the telephone communications network 12, or the user may obtain other services such as directory assistance.

Figure 2:
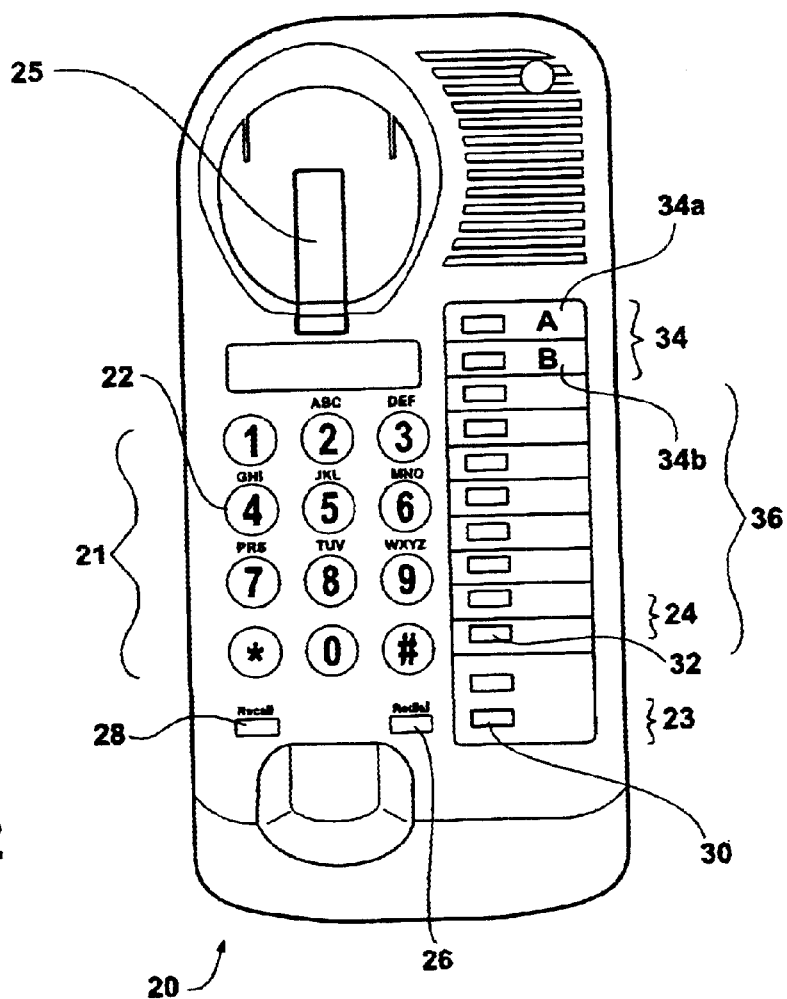
FIG. 2 is a perspective view of a telephone incorporating features of the present invention.

The present invention is an apparatus for automatically providing prestored bypass dialing. The apparatus is embodied in a telephone having conventional features as shown in FIG. 2. By way of example only, the telephone 20 includes a keypad 21 formed of a plurality of individual, depressible push buttons 22. The push buttons are associated with certain numbers or letters as well as indicia, such as a pound sign and a star. On the side of the phone housing or another convenient location, a ringer switch 23 is provided to control the telephone ringer between high and low volume levels or no ring. Also mounted on the side of telephone housing is a dialing mode switch 24 which selects either Pulse or Tone dialing mode.

Also mounted on the front of the telephone housing is a redial push button 26 which can be pressed to redial the last number called and a "flash" push button 28 which can be used to access a call waiting service or other functions.

The push button 30 is a Store button. Depression of the push button 30 will begin and end the telephone number sequence during the storing operation into user-defined memory buttons. In a typical embodiment, depressing the Store push button 30, then the keypad buttons 22 as desired to encode a sequence of numbers, then the Store button 30, and then one of the user-defined memory buttons 36 will store the sequence of numbers in the specific user defined memory button 36.

A pause push button 32 is also mounted on the front of the telephone housing. Depression of the pause button 32 inserts a time delay during the dialing sequence each time it is pressed. For example, depression of the pause button 32 inserts a 0.36 second time delay.

Also mounted on the front of the telephone housing are a plurality of depressible push buttons or switches 34 and 36 shown in two groups. In certain aspects of the present invention, the push buttons 34 may not be provided as a separate group, but may be included in the second set of push buttons 36. Likewise, the number of individual buttons 34 and 36 in each set may be varied.

According to one aspect of the present invention, push buttons 34A, 34B correspond to two distinct bypass code memory dialing numbers. The individual push buttons 36 are memory dialing push buttons. Depression of any push button 36 automatically dials a previously stored telephone number in the selected memory location associated with the depressed push button 36.

It will be understood that the present invention also contemplates the use of a telephone having a display screen with selectable locations or a menu providing prestored memory telephone numbers which may be selected by means of a movable cursor, a touch point, etc. Further, the hook switch 25 may be embodied in display screens, menus, speaker phone buttons, etc. Also, a single bypass push button 34A could be provided or the bypass code stored in the telephone circuitry.

Figure 3:
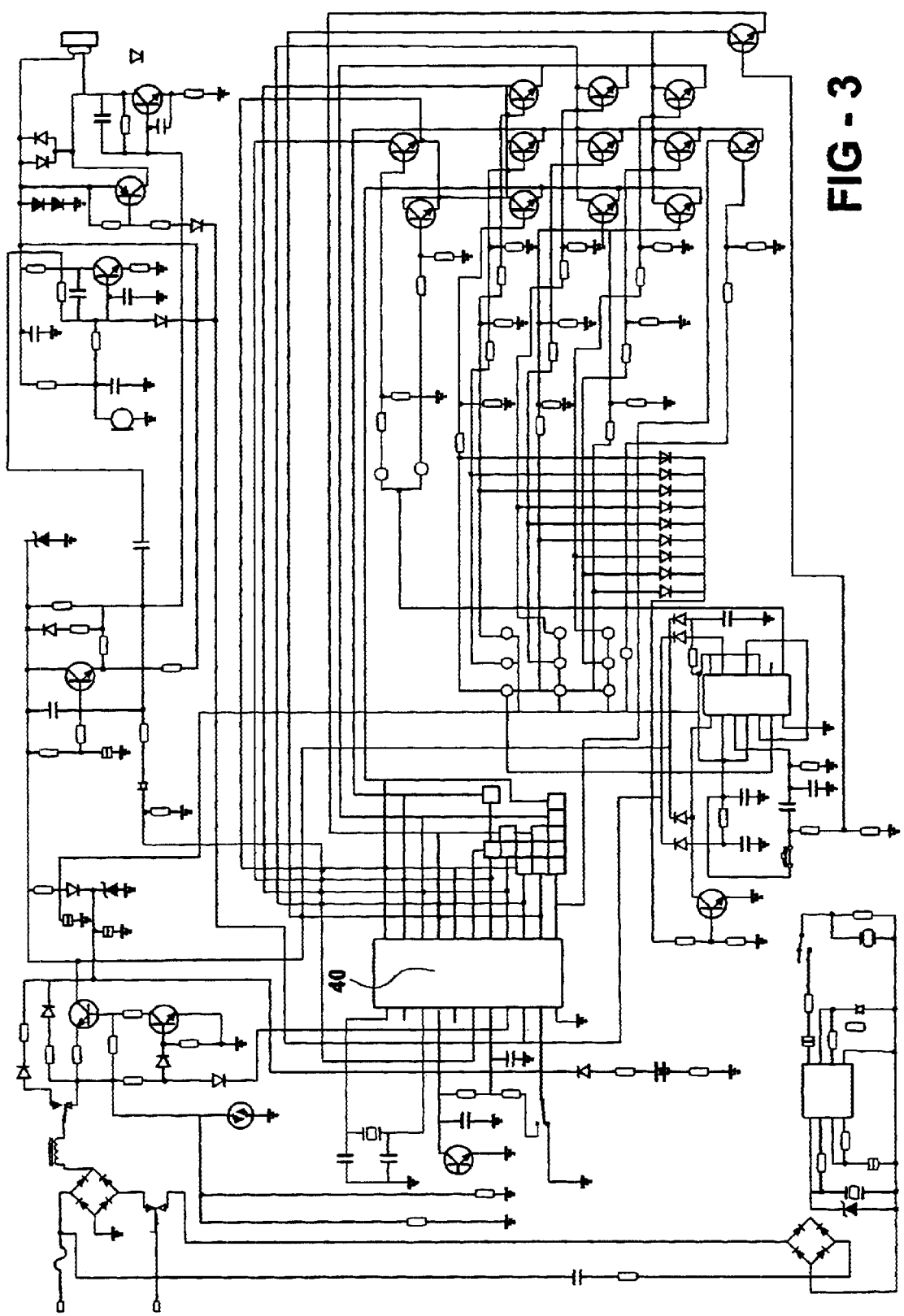
FIG. 3 is a schematic diagram of the circuitry employed in the telephone shown in FIG. 2.

Referring now to FIG. 3, there is depicted a schematic diagram of the circuitry employed in the telephone 20 which controls the standard operation of the telephone 20 in receiving and dialing telephone calls. As shown in FIG. 3, the various keypad push buttons 22 as well as the various function buttons 22, 24, 26, 28, 30, 32 and memory push buttons 34 and 36 are input to a central processing unit 40 having decode and tone converter capabilities, such as in integrated circuit Model No. HT9320C. The central processing unit 40 also includes internal memory for storing a control program which controls the operation of the telephone 20 as well as the various prestored memory telephone numbers individually associated with the push buttons 36.

According to a unique aspect of the present invention, the central processing unit 40 is programmed to block the storage of a leading long distance telephone call indicator "1" when storing each memory telephone number in a specified memory address associated with one of the push buttons 36.

Figure 4A:
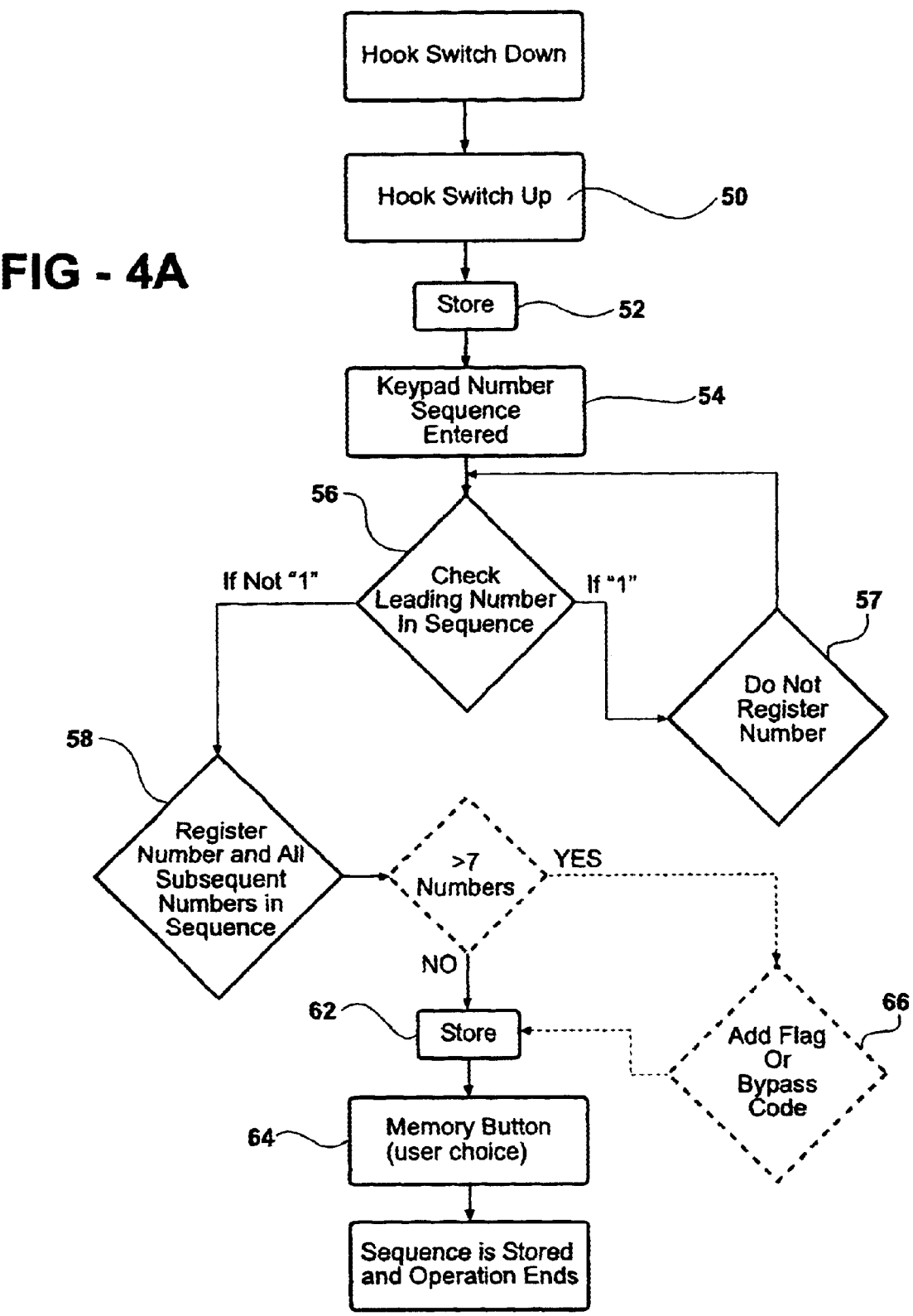
FIGS. 4A–4C are flow charts of exemplary methods employed by the telephone apparatus of the present invention.

FIG. 4A depicts the sequence that the central processing unit 40 follows when storing an individual telephone number in one of the memory locations allocated or associated with one of the memory push buttons 36. The user raises the hook switch on the telephone housing in step 50, presses the Store push button 30 in step 52, and then inputs the desired telephone number to be stored in step 54 by sequentially depressing the push buttons 22 on the keypad 21.

The CPU 40 then determines if the first input number is a long distance call indicator or a "1" in step 56. It will be understood that although dialing an initial "1" currently in the United States indicates a long distance telephone call, other numbers may also be used in place of "1" as indicative of a long distance call which will trigger the bypass dialing features of the present invention.

If the first input number is "1", the CPU 40 does not store the "1" in the selected location in step 57. This screen for a leading "1" continues until a non-"1" number is entered from the keypad buttons 22. If the first digit is not a "1", see step 58, as would be the case where the user entered an area code for a long distance telephone number, the CPU 40 then stores that digit and subsequent digit inputs in a specified location in memory associated with a selected push button 36 as subsequently depressed by the user. To do this, the Store push button 30 is then depressed in step 62 followed by the selected memory location push button 36 in step 64.

It should be noted that the CPU 40, when storing the input telephone number, can optionally store the number with a flag or other indicator as shown in step 66 in FIG. 4A. This in an indication that, when an outgoing call is made and a telephone number is selected by one of the memory push buttons 36, a bypass code must be generated prior to outputting signals to the tone converter corresponding to the selected memory call number. Alternately, the predetermined bypass code may be automatically prestored in user defined memory along with the user inputted number sequence.

Figure 4B:
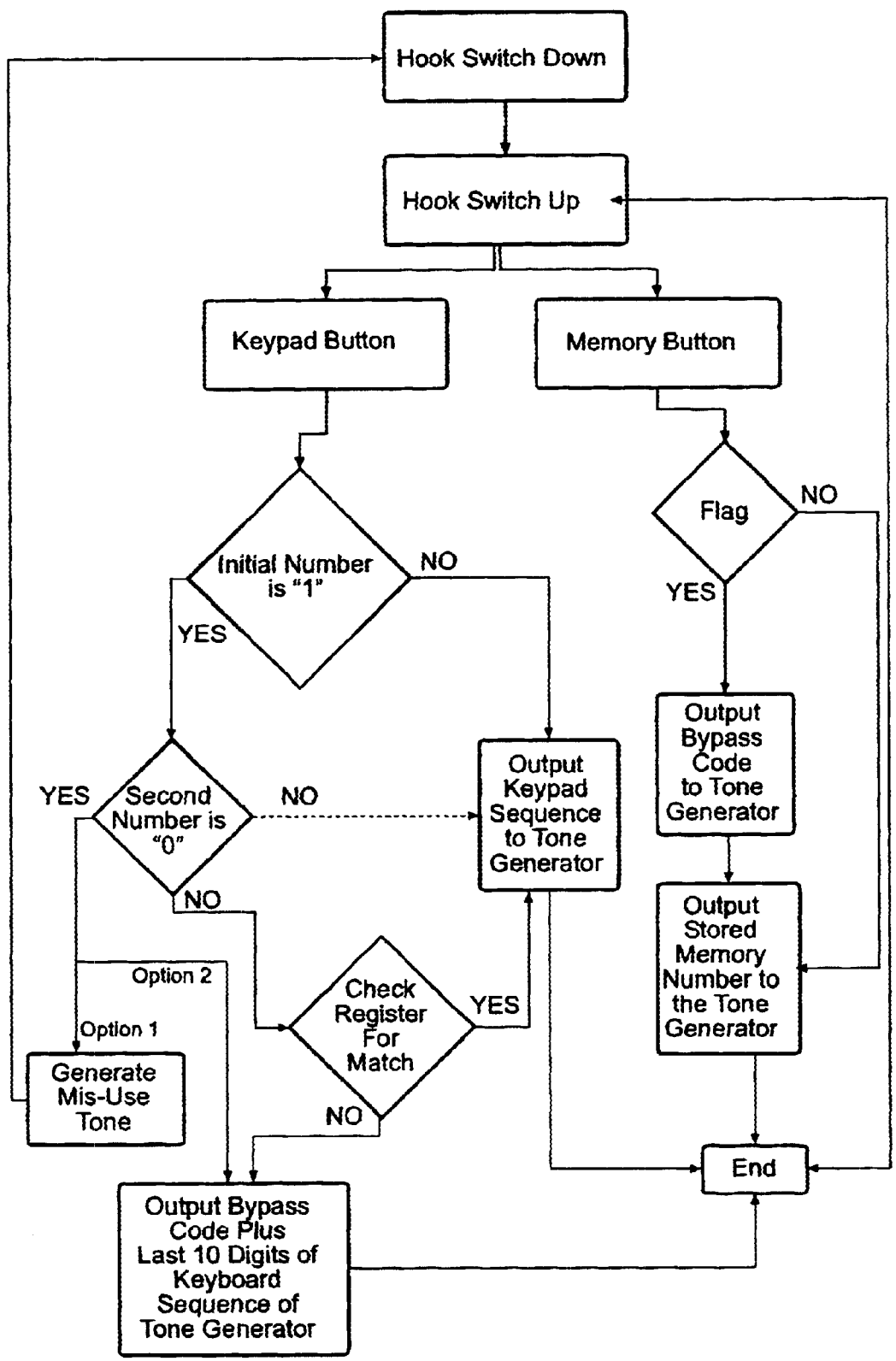

An example of an outgoing call dialing sequence is shown in FIG. 4B. The CPU 40 detects the depression of any of the push buttons 22 on the keypad 21, any of the push buttons 34 and 36, as well as any of the function keys. Upon detecting the depression of any push button, the CPU 40 checks if the depression event is associated with one of the push buttons 22 in the keypad 21 in step 70.

In this case in this embodiment of the present invention wherein the first digit is not a "1" or long distance call indicator (step 72), the CPU 40 outputs the number entered by the user through the keypad 22 directly to the tone generator, step 74. If the outgoing telephone number employs a user dialed access or bypass carrier code, step 76, the CPU 40 will output a preselected bypass carrier code instead of that entered by the user via the keypad 21, or will output a "misuse" tone, step 78, (e.g. alternating high/low tones) to the user if the user initiates a certain sequence of digits, such as 1-0, indicating use of a bypass code.

However, when the detected push button event is a result of the depression of one of the memory push buttons 36, step 90, after the telephone handset has been removed from the cradle or hook, and if the flag or indicator is present in step 92, the CPU 40 will select one of the bypass memory codes associated with the push buttons 34A and 34B in step 94. One of the push buttons 34A and 34B may be depressed prior to the depression of one of the memory push buttons 36 or after the depression of one of the memory push buttons 36. Alternately, the push buttons 34A and 34B may be constructed as alternating push buttons in which one remains in a depressed state until the other push button 34A and 34B is depressed. This enables a particular bypass code to remain in effect until changed by the user.

In any event, the CPU 40 sequentially arranges the selected bypass code associated with the depressed push button 34A or 34B along with the prestored memory call number associated with the depressed memory push button 36 and outputs the digital signals to the tone converter in step 96 for communication to the telephone communications network 12 via the selected bypass carrier 16.

The above embodiment of the present invention hints at one aspect or feature of the present invention in which one of a bypass carrier code associated with the push buttons 34A and 34B is continuously selected for each outgoing long distance telephone call until changed. According to this aspect of the present invention, a single bypass carrier code may be prestored in the circuit of the telephone 20. The prestored bypass code may be stored in a separate solid state memory or in the memory accessed by the CPU 40. The prestored bypass code may be stored in memory or CPU 40 such that it cannot be changed except by replacement of the memory or CPU 40. Alternately, the prestored bypass code may be re-programmable as when stored in a series of dip switches mounted on a circuit board in the housing of the telephone 20. An authorized serviceman could reprogram or change the bypass carrier code as desired by a user by merely repositioning the dip switches to correspond to a new bypass carrier code. Also, new bypass codes could be downloaded to the telephone 20 through the telecommunications network 12.

Alternately, the single bypass carrier code or the two bypass carrier codes shown in the embodiment depicted in FIG. 2, can be re-programmable through the keypad 21 and/or other function push buttons on the telephone 20 in the same manner as a telephone number is stored in memory. A suitable sequence of any one or more function push buttons may be employed after the selected one of the bypass carrier code push buttons 34A or 34B is depressed to enable the CPU 40 to recognize that the "1" as a first digit of an input number from the keypad 21 is part of a bypass carrier code, such as "10-XX-XXX" rather than the initial "1" of a long distance telephone call. The CPU 40 will then store the input bypass carrier code in a memory location corresponding to the depressed push button 34A or 34B along with a following "1". In this manner, whenever one of the bypass carrier code push buttons 34A or 34B is depressed, as described above, the CPU 40 will output a series of signals corresponding to the stored bypass code followed by a "1". The telephone number associated with the memory push button in the set 36 is then output by the CPU 40 to complete the generation of the telephone call number.

Specifically, the user in a typical dialing sequence, after lifting the hand piece and obtaining a dial tone, first depresses a bypass carrier code push button 34A or 34B and subsequently pushes a user-defined memory button 36. In a typical embodiment, the tones generated to the telephone communication network would be 10-XX-XXX-1 (this being prestored in the bypass carrier code push button 34A or 34B, where X represents numbers of a specific bypass carrier) followed by AAA-EEE-NNNN (this being prestored in a user-defined memory associated with each memory push button 36, where A are area code numbers, E are local exchange numbers, and N are specific telephone numbers) to connect the user with a telephone number of the user's choosing through a bypass carrier 16 in the telecommunication network 12.

While the present invention automatically blocks the storage of a long distance call number indicator or "1" as the beginning number in a sequence of numbers stored in a memory location associated with a selected memory push button 36, the keypad 21, in the embodiment shown in FIG. 2 and described above, may still be used in a conventional manner to dial local and long distance phone calls and to use any access carrier code or bypass carrier code input by the user or automatically preselected in the case of an access carrier code. It is also possible with the present invention to couple the keypad 21 to the stored bypass code so that all long distance telephone calls dialed through the keypad 21 also automatically incorporate the prestored bypass code, or, in the alternative, to generate a "misuse" tone to the user.

Figure 4C:
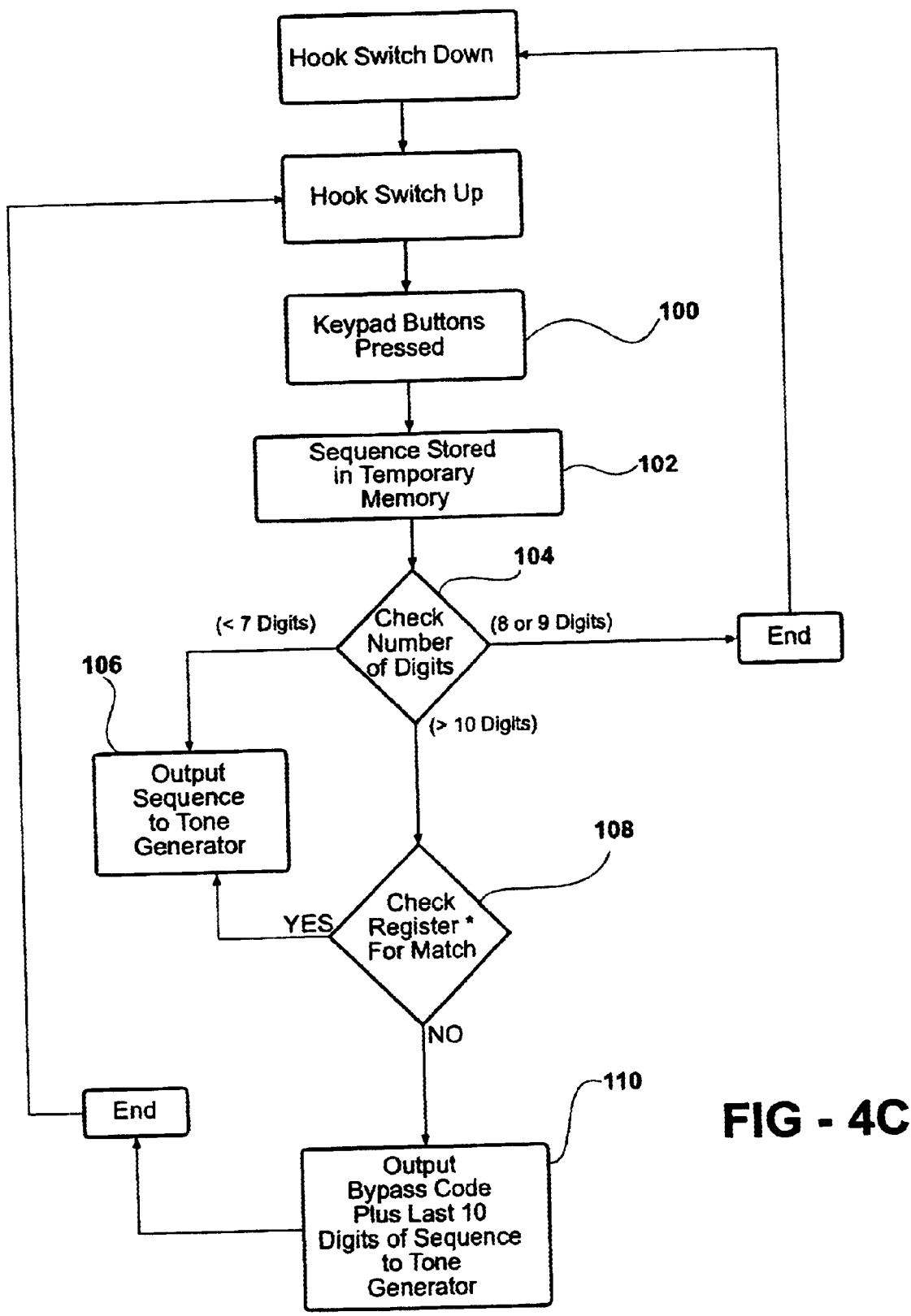

As shown in FIG. 4C, a modification to the dial sequence in FIG. 4B as described above, will now be described. Upon detecting the depression of one of the push buttons 22 in the keypad 21, in step 100, the CPU 40 stores the numeric sequence in temporary memory in step 102 and then counts the number of sequentially depressed keypad push buttons 22 in step 104. If the total number of depressed push buttons representative of an input telephone number is less than or equal to seven, the CPU 40 recognizes the input telephone number as a local call and then outputs signals corresponding to the input telephone number to the tone generator in step 106.

If more than seven numbers are input from the keypad 21, and the total number of input digits equals eleven, the CPU 40 automatically inserts the selected or prestored bypass code 10-XX-XXX before the first "1" or long distance telephone call indicator and the following area code so that the outgoing telephone call automatically accesses the bypass carrier 16 for connection to the telephone communication network 12. If the number of input digits totals 10, the CPU 40 automatically inserts 10-XX-XXX-Z (where Z is the long distance indicator, e.g., 1).

The CPU 40 can also be programmed to compare at least the beginning four digits of the input telephone call number to make a determination whether the telephone call is a regular long distance telephone call or corresponds to special telephone communication network functions, such as 1-800, 1-888, 1-877. This determination is made in step 108 before the CPU 40 automatically inserts the prestored bypass code into the proper sequence input telephone number in step 110. In the event that one of the special codes is recognized by the CPU 40, the CPU 40 merely passes the input telephone number to the tone generator, step 106, without adding the bypass code.

In summary, the present invention is an apparatus for automatic bypass telephone code dialing which outputs a bypass carrier code in a proper telecommunication numeric sequence with a prestored telephone number memory or a keypad entered telephone number.

The invention also enables the bypass carrier code(s) to be easily changed.

The present invention uniquely enables bypass carrier code dialing to be automatically implemented on all outgoing memory telephone calls which require a long distance carrier. In various aspects, the apparatus is capable of ensuring that bypass carrier code is used with all outgoing telephone calls implemented through the telephone keypad or only through the memory push buttons in which case the telephone keypad is operable in a normal manner to dial long distance calls, special telephone functions, and even long distance telephone calls with other bypass carrier codes or interexchange carrier codes.

What is claimed is:

1. A method for automatic bypass code dialing comprising the steps of:
   a. providing a bypass carrier code to connect a telecommunication device with a communication network;
   b. automatically including the bypass carrier code on each outgoing toll and long distance telephone call from the telecommunication device;
   c. providing a plurality of memory locations in the telecommunication device for storing individual telephone numbers;
   d. entering a telephone number having a series of digits;
   e. checking the first telephone number digit and, if the first telephone number digit is not a lone distance call indicator, registering all of the telephone number digits in input sequence; and
   f. if the first input telephone numeric digit is a long distance call indicator, not registering the first telephone number digit and repeating step c for each succeeding telephone number digit.

2. The method of claim 1 further comprising the steps of:
   storing a telephone number in memory in the telecommunication device;
   selecting the memory telephone number; and
   automatically including the bypass carrier code with the memory telephone number in proper telecommunication numeric sequence in each outgoing telephone call to the communication network when the memory telephone number is selected.

3. The method of claim 1 further comprising the steps of:
   providing the telecommunication device with numeric input; and
   reprogramming the bypass carrier code stored in the telecommunication device through the numeric input.

4. The method of claim 1 further comprising the steps of:
   storing a plurality of bypass carrier codes in the telecommunication device; and
   selecting one of the plurality of bypass carrier codes on each outgoing telephone call from the telecommunication device requiring a long distance carrier.

5. The method of claim 4 wherein the step of selecting one of the bypass carrier codes comprise:
   providing a selector on the telecommunication device for selecting a distinct one of the plurality of bypass carrier codes stored in the telecommunication device.

6. A method for automatic bypass code dialing comprising the steps of:
   a. providing a bypass carrier code to connect a telecommunication device with a communication network;
   b. automatically including the bypass carrier code on each outgoing toll and long distance telephone call from the telecommunication device;
   c. providing a plurality of memory locations in the telecommunication device for storing individual telephone numbers;
   d. entering a telephone number having a series of digits;
   e. checking the first telephone number digit and, if the first telephone number digit is not a long distance call indicator, registering all of the telephone number digits in input sequence;
   f. if the telephone number digits total more than seven, adding a bypass carrier code indicator to the entered telephone number and storing the telephone number and bypass carrier code indicator in a memory location;

g. if the telephone number digits are less than or equal to seven, storing the telephone number digits in the input sequence in a selected memory location in the telecommunication device; and h. if the first input telephone numeric digit is a long distance call indicator, not registering the first telephone number digit and repeating steps c–h.

7. A method for automatic bypass code dialing comprising the steps of:

providing a bypass carrier code to connect a telecommunication device with a communication network;

automatically including the bypass carrier code on each outgoing toll and long distance telephone call from the telecommunication device;

determining if a first input telephone number digit is from a numeric input or a memory telephone number selector on the telecommunication device;

if the input telephone number digit is input by the keypad, determining if the first digit is a long distance call indicator;

if the first digit is not a long distance call indicator, checking the second digit for a prestored telephone number selector;

if the second digit is a prestored telephone number, outputting the entire telephone number digit sequence to a tone generator in the telecommunication device;

if the second digit is not a prestored telephone number, outputting the bypass carrier code and the last ten entered input numeric digits to the tone generator;

if the first entered digit is not a long distance call indicator, outputting all of the entered numeric digits to the tone generator;

if the telephone number digit is from the prestored memory telephone number, determining if a bypass carrier code indicator is associated with the stored memory telephone number;

if the bypass carrier code indicator is not associated with the stored memory telephone number, outputting the memory pushbutton telephone number to the tone generator; and if the bypass carrier code indicator is associated with in the stored memory telephone number, supplying the bypass carrier code to the tone generator and then supplying the memory stored telephone number to the tone generator.

8. A method for automatic bypass code dialing comprising the steps of:

providing a bypass carrier code to connect a telecommunication device with a communication network;

automatically including the bypass carrier code on each outgoing toll and long distance telephone call from the telecommunication device;

determining if a telephone numeric digit input is from a keypad on the telecommunication device;

checking the total number of telephone number digits input through the keypad;

if the total number of input telephone number digits are less than or equal to seven, outputting the input telephone number digits to the tone generator;

if the total number of input telephone number digits is greater than or equal to ten digits, checking a prestored telephone number for a match;

if a match exists, outputting the input telephone number digits to the tone generator; and if there is no match, outputting the prestored bypass carrier code and the last ten digits in proper telecommunication numeric sequence to the tone generator.

9. A method for automatic bypass code dialing comprising the steps of:

providing a bypass carrier code to connect a telecommunication device with a communication network;

automatically including the bypass carrier code on each outgoing toll and long distance telephone call from the telecommunication device;

storing a telephone number in memory in the telecommunication device;

selecting the memory telephone number;

automatically including the bypass carrier code with the memory telephone number in proper telecommunication numeric sequence in each outdoing telephone call to the communication network when the memory telephone number is selected; and preventing the storage in a memory location of the telecommunication device of a telephone number that begins with a long distance call indicator.

10. A method for automatic bypass code dialing comprising the steps of:

providing a bypass carrier code to connect a telecommunication device with a communication network;

automatically including the bypass carrier code on each outgoing toll and long distance telephone call from the telecommunication device; and preventing a tone generator in the telecommunication device from outputting a long distance call indicator as part of an outgoing telephone call to the communication network.

11. A method for automatic bypass code dialing comprising the steps of:

storing at least one bypass code in the telecommunication device;

allowing the user to select the bypass code before using the telecommunication device to generate an outgoing telephone number to a communication network;

preventing the storage in a memory location of the telecommunication device of a telephone number that begins with a long distance call indicator.

12. A method for automatic bypass code dialing comprising the steps of:

storing at least one bypass code in the telecommunication device;

allowing the user to select the bypass code before using the telecommunication device to generate an outgoing telephone number to a communication network; and preventing a tone generator in the telecommunication device from outputting a long distance call indicator as part of an outgoing telephone call to the communication network.

13. The method of claim 11 further comprising the step of:

adding the bypass code to all outgoing telephone calls following a long distance call indicator.

14. A telecommunication apparatus for making outgoing telephone calls through a connection to a communication network including at least one bypass carrier selectable by a bypass carrier code, the telecommunication apparatus comprising:

a numeric input on the telecommunication device for inputting a telephone number formed of a plurality of sequential numeric digits;

a memory for storing a bypass carrier code;

a control automatically inserting the bypass carrier code on each outgoing toll and long distance telephone call from the telecommunication device in proper telecommunication numeric sequence;

the control includes means for counting the number of input numeric digits; and the control including means for determining if the number of input numeric digits is less than or equal to seven and outputting the input numeric digits, for determining if the number of input numeric digits is greater than or equal to ten and then outputting the prestored bypass carrier code and the input numeric digits.

15. The telecommunication apparatus of claim 14 further comprising:

the memory including a storage of a plurality of input memory telephone numbers;

inputs on the telecommunication device for selecting one of the memory telephone numbers; and the control automatically inserting the selected bypass carrier code in proper telecommunication numeric sequence with the selected memory telephone number on each outgoing telephone call.

16. The telecommunication apparatus of claim 14 wherein the bypass carrier code is not-changeably stored in the memory.

17. The telecommunication apparatus of claim 14 wherein the bypass carrier code is re-programmably stored in the memory.

18. The telecommunication device of claim 15 further comprising:

a bypass carrier code indicator stored with an input memory telephone number in the memory; and the control detecting the bypass carrier code indicator on selection of a memory telephone number and outputting the prestored bypass carrier code with the memory telephone number in proper telecommunication numeric sequence.

* * * * *